United States Patent
Noda et al.

(10) Patent No.: US 12,043,564 B2
(45) Date of Patent: *Jul. 23, 2024

(54) MANUFACTURING APPARATUS AND MANUFACTURING METHOD OF POROUS GLASS BASE MATERIAL FOR OPTICAL FIBER

(71) Applicant: SHIN-ETSU CHEMICAL CO., LTD., Tokyo (JP)

(72) Inventors: Naoto Noda, Ibaraki (JP); Hitoshi Iinuma, Gunma (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 14 days.

This patent is subject to a terminal disclaimer.

(21) Appl. No.: 17/872,407

(22) Filed: Jul. 25, 2022

(65) Prior Publication Data

US 2022/0363583 A1    Nov. 17, 2022

Related U.S. Application Data

(62) Division of application No. 16/896,623, filed on Jun. 9, 2020, now Pat. No. 11,427,495.

(30) Foreign Application Priority Data

Jun. 11, 2019    (JP) .................. 2019-109084

(51) Int. Cl.
    *C03B 37/014*    (2006.01)
    *C03B 37/016*    (2006.01)
    (Continued)

(52) U.S. Cl.
    CPC ...... *C03B 37/01433* (2013.01); *C03B 37/016* (2013.01); *C03B 37/07* (2013.01); *G02B 1/046* (2013.01)

(58) Field of Classification Search
    None
    See application file for complete search history.

(56) References Cited

U.S. PATENT DOCUMENTS 5,078,092 A    1/1992    Antos et al.
5,632,797 A  *  5/1997    Williams ............... B01D 3/06
                                                    261/DIG. 65
(Continued)

FOREIGN PATENT DOCUMENTS

CN    112266161 A  *  1/2021    ........... C03B 37/014
EP    0941971           9/1999
(Continued)

OTHER PUBLICATIONS

CN-112266161-A Machine Translation Retrieved Nov. 3, 2023. (Year: 2023).*

(Continued)

*Primary Examiner* — Lisa L Herring
(74) *Attorney, Agent, or Firm* — Greenblum & Bernstein, P.L.C.

(57) ABSTRACT

A manufacturing method of a porous glass base material for optical fiber includes: controlling a flow rate of a raw material liquid of an organic siloxane by a liquid mass flow controller; introducing raw material liquid to a raw material liquid nozzle of a vaporizer by a raw material liquid pipe; ejecting raw material liquid into the vaporizer; mixing raw material liquid and carrier gas to vaporize raw material liquid to form mixed gas; supplying mixed gas to a burner; combusting mixed gas together with a combustible gas and a combustion supporting gas in the burner to produce $SiO_2$ particles; depositing $SiO_2$ particles on a starting core base material to form the porous glass base material; and closing an open/close valve on a flow path of the raw material liquid pipe to stop supply of raw material liquid, while continuing (Continued)

to supply carrier gas, combustible gas, and combustion supporting gas.

6 Claims, 1 Drawing Sheet

(51) Int. Cl.
    *C03B 37/07*     (2006.01)
    *G02B 1/04*     (2006.01)

(56) References Cited

U.S. PATENT DOCUMENTS

| 2012/0276291 | A1 | 11/2012 | Bird |
| 2013/0133376 | A1* | 5/2013 | Fabian ............... C03B 19/1415 65/17.2 |
| 2014/0349830 | A1 | 11/2014 | Trommer |
| 2019/0092677 | A1 | 3/2019 | Oozeki |
| 2019/0112218 | A1 | 4/2019 | Otosaka |
| 2021/0246065 | A1* | 8/2021 | Hayakawa ............ C03B 37/018 |

FOREIGN PATENT DOCUMENTS

| JP | 2000-264648 | 9/2000 |
| JP | 2018-145065 | 9/2018 |
| JP | 2019-73406 | 5/2019 |

OTHER PUBLICATIONS

JP 2018-145065 A Clarivate Analytics Machine Translation Retrieved Jan. 2022. (Year: 2022).

JP 2000-264648 A Clarivate Analytics Machine Translation Retrieved Jun. 14, 2023. (Year: 2023).

Office Action, U.S. Patent and Trademark Office, issued in U.S. Appl. No. 17/872,376, mailed Jun. 21, 2023.

* cited by examiner

MANUFACTURING APPARATUS AND MANUFACTURING METHOD OF POROUS GLASS BASE MATERIAL FOR OPTICAL FIBER

CROSS-REFERENCE TO RELATED APPLICATIONS

This non-provisional application is a divisional application of U.S. patent application Ser. No. 16/896,623, filed at the U.S. Patent and Trademark Office on Jun. 9, 2020, and claims priority under 35 U.S.C. § 119(a) from Japanese Patent Application No. 2019-109084, filed on Jun. 11, 2019, and the entire contents of each of the above-noted applications are incorporated herein by reference in entirety.

BACKGROUND

Technical Field

The present invention relates to a manufacturing method of porous glass base material for an optical fiber using organic siloxane as a raw material.

Background Art

A preforms for optical fiber is manufactured, for example, by externally depositing $SiO_2$ fine particles by the OVD method or the like on a core base material manufactured by the VAD method or the like and sintering the deposited body. As a silicon compound raw material for externally depositing the $SiO_2$ fine particles on the core base material, an organic silicon compound containing no Cl (chlorine) in molecules is sometimes used as a starting raw material of the $SiO_2$ fine particles. An example of such an organic silicon compound is octamethylcyclotetrasiloxane (OMCTS), which is a high-purity organic siloxane available on an industrial scale. JP-2019-073406A discloses a technique for supplying the OMCTS to a burner and for synthesizing glass fine particles in oxyhydrogen flame.

When OMCTS is used as the starting raw material, $SiO_2$ fine particles are produced by the reaction shown below.

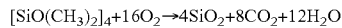

$$[SiO(CH_3)_2]_4 + 16O_2 \rightarrow 4SiO_2 + 8CO_2 + 12H_2O$$

As described above, when the halogen-free organic siloxane typified by OMCTS is used as the silicon compound raw material supplied to the burner, hydrochloric acid is not discharged. For this reason, there is an advantage that the degree of freedom in the material of the manufacturing apparatus and the handling of exhaust gas is high.

The deposition of the $SiO_2$ fine particles using organic siloxane as a starting material is performed as follows, for example.

First, the organic siloxane raw material liquid is introduced into a vaporizer while the flow rate is controlled by a liquid mass flow controller. Subsequently, the raw material liquid injected from a raw material liquid nozzle and the carrier gas are mixed in the vaporizer, and the raw material liquid is vaporized to generate a raw material gas in a gaseous state. The raw material gas mixes with the oxygen gas downstream of the vaporizer to form a raw material mixed gas. The raw material mixed gas, combustible gas, and combustion supporting gas are supplied to a burner, where $SiO_2$ fine particles are produced by combustion reaction.

SUMMARY OF THE INVENTION

Problems to be Solved by the Invention

The produced $SiO_2$ fine particles are deposited on the core base material. After depositing a predetermined amount of $SiO_2$ fine particles, the supply of the raw material to the vaporizer is stopped. At this time, the raw material liquid is accumulated in a raw material liquid pipe and the raw material liquid nozzle downstream of the liquid mass flow controller, and a polymerization product and a gel-like substance are likely to be produced at the tip of the raw material liquid nozzle in the vaporizer heated above the boiling point of the raw material liquid.

The present invention has been made in view of the above-mentioned problems, and an object of the present invention is to prevent the polymerization product or the gel-like substance from being produced at the tip of the raw material liquid nozzle in the vaporizer while supply of the raw material is stopped with respect to organic siloxane raw materials typified by octamethylcyclotetrasiloxane (OMCTS).

Means for Solving the Problems

That is, in order to solve the above problems, a porous glass base material manufacturing apparatus for an optical fiber according to the present invention includes: a liquid mass flow controller for controlling a flow rate of a raw material liquid of an organic siloxane; a vaporizer for mixing the raw material liquid and a carrier gas to vaporize the raw material liquid to form a mixed gas in which a raw material gas and the carrier gas are mixed; a raw material liquid nozzle for ejecting the raw material liquid into the vaporizer; a carrier gas supply pipe for supplying the carrier gas into the vaporizer; a raw material liquid pipe for introducing the raw material liquid supplied from the liquid mass flow controller into the raw material liquid nozzle; a burner for combusting the mixed gas together with a combustible gas and a combustion supporting gas to produce $SiO_2$ fine particles; a mixed gas pipe for supplying the mixed gas to the burner; an open/close valve provided on a flow path of the raw material liquid pipe; and a purge gas supply pipe that joins the raw material liquid pipe between the open/close valve and the raw material liquid nozzle to supply a purge gas.

The manufacturing apparatus according to the present invention may further include means for adjusting the flow rate of the purge gas supplied to the purge gas supply pipe. The manufacturing apparatus may further comprise a means for adjusting the flow rate of the carrier gas supplied to the carrier gas supply pipe.

The manufacturing apparatus according to the present invention may further include an oxygen gas supply pipe that joins an oxygen gas in the middle of the mixed gas pipe. In this instance, when the flow rate of the purge gas supplied from the purge gas supply pipe is $L_P$ and the flow rate of the oxygen gas supplied from the oxygen gas supply pipe is $L_{O2}$, the purge gas and the oxygen gas may be supplied from the purge gas supply pipe and the oxygen gas supply pipe, respectively, so that $L_{O2}/L_P > 14$ is satisfied, in a state in which the open/close valve is closed and the supply of the raw material is stopped.

In the present invention, when the flow rate of the purge gas supplied from the purge gas supply piping is $L_P$ and the flow rate of the carrier gas supplied from the carrier gas supply pipe is $L_C$, the purge gas and the carrier gas may be supplied from the purge gas supply pipe and the carrier gas supply pipe, respectively, so that $L_C/L_P>10$ is satisfied, in a state in which the open/close valve is closed and the supply of the raw material is stopped.

Further, a manufacturing method of a porous glass base material for optical fiber according to the present invention comprises steps of: controlling a flow rate of a raw material liquid of an organic siloxane by a liquid mass flow controller; introducing the raw material liquid supplied from the liquid mass flow controller to a raw material liquid nozzle of a vaporizer by a raw material liquid pipe; ejecting the raw material liquid from the raw material liquid nozzle into the vaporizer; mixing the raw material liquid ejected in the vaporizer and the carrier gas to vaporize the raw material liquid to form a mixed gas in which the raw material gas and the carrier gas are mixed; supplying the mixed gas to a burner; combusting the mixed gas together with a combustible gas and a combustion supporting gas in the burner to produce $SiO_2$ fine particles; depositing $SiO_2$ fine particles on a starting core base material to form the porous glass base material for optical fiber; closing an open/close valve provided on a flow path of the raw material liquid pipe to stop the supply of the raw material liquid from the liquid mass flow controller; and supplying a purge gas from a purge gas supply pipe that joins the raw material liquid pipe between the open/close valve and the raw material liquid nozzle to the raw material liquid pipe.

The manufacturing method according to the present invention may further include a step of additionally mixing oxygen gas into the mixed gas and supplying the mixed gas to the burner. In this instance, when the flow rate of the purge gas supplied from the purge gas supply pipe is $L_P$ and the flow rate of the oxygen gas additionally mixed is $L_{O2}$, in the step of supplying the purge gas to the raw material liquid pipe, the purge gas and the oxygen gas may respectively be supplied so that $L_{O2}/L_P>14$ is satisfied.

In the manufacturing method according to the present invention, when the flow rate of the purge gas supplied from the purge gas supply pipe is $L_P$ and the flow rate of the carrier gas supplied to the vaporizer is $L_C$, in the step of supplying the purge gas to the raw material liquid pipe, the purge gas and the carrier gas may respectively be supplied so that $L_C/L_P>10$ is satisfied.

In the present invention, the carrier gas may be any of nitrogen, argon, and helium. The organic siloxane may be octamethylcyclotetrasiloxane (OMCTS).

Effect of the Invention

According to the present embodiment, it is possible to prevent the polymerization product or the gel-like substance from being produced at the tip of the raw material liquid nozzle with respect to organic siloxane raw materials typified by octamethylcyclotetrasiloxane (OMCTS).

DETAILED DESCRIPTION OF THE EMBODIMENTS

Figure 1:
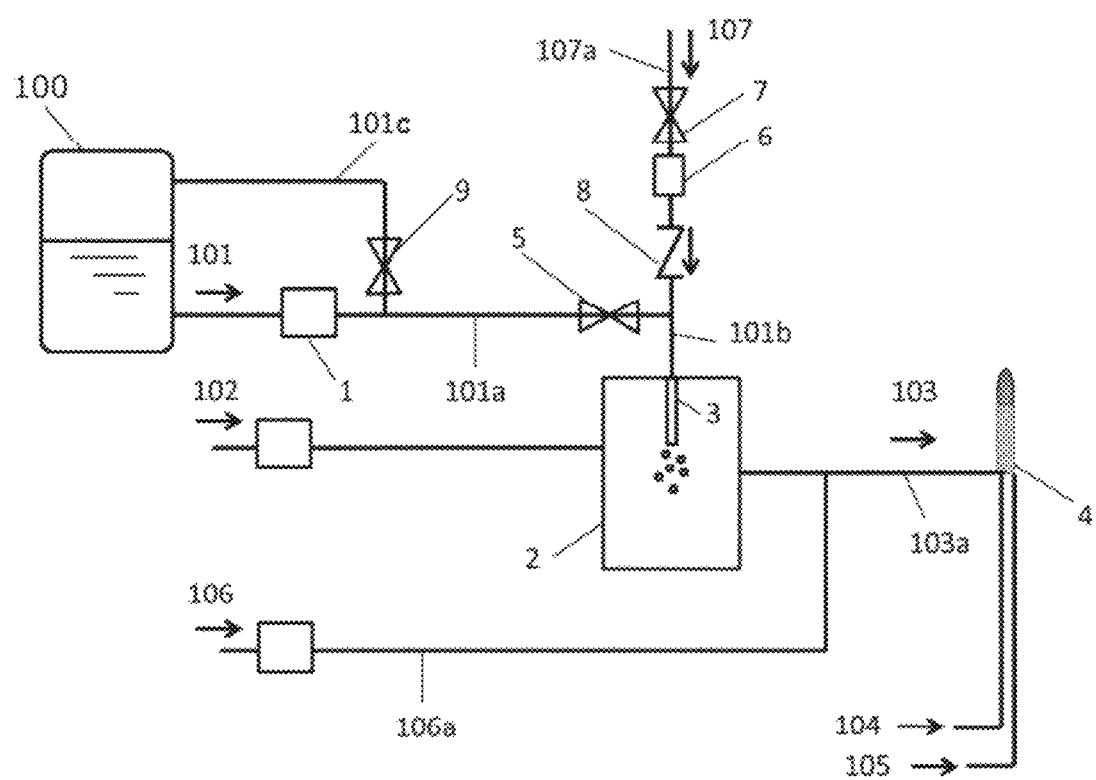
FIG. 1 is a supply flow diagram around the vaporizer in the manufacturing apparatus of the porous glass preform for optical fiber according to the present embodiment.

Hereinafter, embodiments of the present invention will be described in detail, but the present invention is not limited thereto.

FIG. 1 is a supply flow diagram around a vaporizer in the manufacturing apparatus of the porous glass preform for optical fiber according to the present embodiment. A flow rate of a raw material liquid 101 contained in a raw material tank 100 is controlled by a liquid mass flow controller 1, and the raw material liquid 101 is supplied to a vaporizer 2 through a raw material liquid pipes 101a and 101b. The raw material liquid 101 is ejected from the tip of a raw material liquid nozzle 3 in the vaporizer 2, and is formed into fine droplets by the carrier gas 102 introduced into the vaporizer 2, and is heated. As a result, the raw material liquid 101 is vaporized to form a mixed gas 103 in which the raw material gas and the carrier gas 102 are mixed. The mixed gas 103 is supplied to a burner 4 via a mixed gas pipe 103a. The mixed gas 103 is combusted together with a combustible gas 104 and a combustion supporting gas 105 to produce $SiO_2$ fine particles. At this time, in order to promote the combustion of the raw material gas, an oxygen gas 106 supplied from an oxygen gas supply pipe 106a may be joined in the middle of the mixed gas pipe 103a, and the mixed gas may be mixed with the oxygen gas 106 before being supplied to the burner 4. The burner 4 is reciprocated relatively along a starting core base material by a reciprocating moving unit (not shown) while producing the $SiO_2$ fine particles as described above, thereby depositing externally on the starting core base material.

The temperature of the vaporizer 2 is set based on the viewpoint of efficiently vaporizing the raw material liquid 101 and preventing polymerization of the raw material liquid 101. When OMCTS is used as the organic siloxane raw material, it is preferable to set the temperature of the vaporizer 2 to a temperature of 160° C. or more and 220° C. or less. When the temperature is low, the vapor pressure of the raw material liquid is lowered, and when the temperature is lower than 160° C., the vaporization efficiency significantly decreases. When the temperature exceeds 220° C., the polymer derived from the raw material liquid 101 may be deposited particularly near the raw material liquid nozzle 3. Further, the mixed gas pipe 103a up to the burner 4 arranged downstream of the vaporizer 2 is preferably heated to a temperature higher than the liquefaction temperature of the raw material gas so that the raw material gas in the mixed gas 103 is not liquefied. The liquefaction temperature of the raw material gas can be obtained by experiments, and the liquefaction temperature T can also be easily obtained by reverse calculation from Antoine equation $$\log_{10}P_s = A - \frac{B}{T+C} \quad (1)$$

(equation (1)) using the raw material gas partial pressure Ps obtained from the pressure in the pipe and the molar ratio of the raw material components in the mixed gas 103.

In the above equation, A, B, and C are coefficients obtained according to the raw material species.

For example, when organic siloxane OMCTS is used as a raw material, coefficients of A=8.8828, B=1358.7, and C=175.06 are known. If these coefficients and the OMCTS partial pressure of 30 kPa are used, T will be 133° C. The equation (1) is merely an experimental equation to which data are fitted, and there is a possibility that the pipe temperature drops by several degrees instantaneously or locally due to a change in the flow rate of the mixed gas 103 or the like. Therefore, in order to prevent re-liquefaction of the raw material gas with a margin, it is actually preferable to heat the mixed gas pipe 103a to a temperature at least 20° C. higher than the liquefaction temperature T obtained by using the equation (1). Further, when the temperature of the mixed gas pipe 103a exceeds 220° C., the polymer derived from the raw material tends to deposit on the inner wall of the mixed gas pipe 103a, and therefore, it is preferable to suppress the temperature of the mixed gas pipe 103a to 220° C. or less.

When the external deposition amount reaches a predetermined amount, the open/close valve 5 provided between the raw material liquid pipe 101a and the raw material liquid pipe 101b is closed to stop the supply of the raw material liquid. Thereafter, the purge gas 107 is supplied from the purge gas supply pipe 107a that joins the raw material liquid pipe 101b on the downstream side of the open/close valve 5, and the raw material liquid 101 accumulated in the raw material liquid pipe 101b and the raw material liquid nozzle 3 is purged to the vaporizer 2. As the purge gas, an inert gas which hardly reacts with the raw material liquid may be used, and for example, nitrogen, argon, helium, or the like can be used.

Even after the raw material liquid 101 is purged, the carrier gas 102 may continue to be supplied into the vaporizer 2. As a result, the purged raw material liquid evaporates in the vaporizer 2 to become a raw material gas, is entrained with the carrier gas 102, and is discharged to the burner 4 through the mixed gas pipe 103a. At this time, it is preferable that the combustible gas 104 and the combustion supporting gas 105 are also supplied to the burner 4 to continue the combustion reaction until all the purged raw material liquid is evaporated. By doing so, it is possible to prevent the unreacted raw material gas from condensing and contaminating the inner wall of a deposition container. At this time, the $SiO_2$ fine particles ejected from the burner 4 due to the purged raw material liquid may be further deposited on the outer periphery of the porous glass base material.

After the supply of the raw material liquid 101 is once stopped and the manufacturing of the base material is completed, when the open/close valve 5 is opened and the supply of the raw material liquid 101 is restarted in order to produce the next base material, it takes time until the raw material liquid 101 completely replaces the purge gas remaining in the raw material liquid pipe 101b and the raw material liquid nozzle 3. Therefore, it is preferable that the volume of the portion of the raw material liquid pipe 101b and the raw material liquid nozzle 3 to be purged by the purge gas be as small as possible. When OMCTS is used as the raw material, the volume of the raw material liquid pipe 101b and the raw material liquid nozzle 3 to be purged is $V_1$ [ml], and the full range flow rate of liquid mass flow controller for the raw material is F [g/min], it is preferable that $(0.95 \times 60 \times V_1)/F < 10$ is satisfied. It is more preferable that $(0.95 \times 60 \times V_1)/F < 5$ is satisfied. It is further more preferable that $(0.95 \times 60 \times V_1)/F < 1$ is satisfied. Note that 0.95 [g/ml] is the specific gravity of OMCTS at normal temperature.

When generalized to a material other than OMCTS (specific gravity thereof is S), it is preferable that $(S \times 60 \times V_1)/F < 10$ is satisfied. It is more preferable that $(S \times 60 \times V_1)/F < 5$ is satisfied. It is further more preferable that $(S \times 60 \times V_1)/F < 1$ is satisfied.

In order to reduce the volume of the pipe, it may be narrowed inner diameter of the raw material liquid pipe, or it may be shortened the length of the raw material liquid pipe. When reducing the inner diameter of the raw material liquid pipe, in order to prevent the supply of the raw material liquid during manufacturing from being affected by increase of the pressure, it is preferable to adjust the inner diameter and the length of the raw material liquid pipe so that the pressure loss applied to the raw material liquid pipe 101b is 10 kPa or less when the full-range flow rate F of the liquid mass flow controller for the raw material is flowed. The pressure loss is more preferably 5 kPa or less, and more preferably 1 kPa or less.

In this manner, since the volume to be gas purged after the supply of the raw material is stopped becomes small, only the raw material liquid pipe 101b and the raw material liquid nozzle 3 need to be replaced with the raw material liquid 101 when the next supply of the raw material is started. Then, after the flow rate is controlled by the liquid mass flow controller 1, the raw material is supplied to the burner 4 in a short time. Immediately after the supply of the raw material is started, if the flow rate to be supplied is temporarily increased by the liquid mass flow controller (for example, by setting it to the full range), the replacement time can be further shortened.

After the deposition is completed, when the raw material liquid 101 remaining in the raw material liquid pipe 101b or the raw material liquid nozzle 3 is purged after the raw material supply is stopped, if the flow rate of the purge gas 107 is too large with respect to the flow rate of the carrier gas, liquefaction or incomplete combustion is likely to occur at the outlet of the burner 4. If an unreacted raw material droplet adheres to the surface of the porous glass base material under production due to liquefaction or incomplete combustion, or if the density of the soot layer to be deposited locally decreases, cracks may occur in the base material from this point as a starting point. Liquefaction occurs when the purged raw material liquid is not vaporized sufficiently in the vaporizer 2 and is discharged as droplets toward the burner 4, or when the raw material components in the mixed gas are supplied to the burner 4 in a high-concentration state and are condensed in the low temperature portion near the burner 4. The incomplete combustion occurs because the flow rate of the oxygen gas 106 and the combustion supporting gas 105 supplied to the burner 4 is insufficient for the raw material component in the mixed gas.

The raw material liquid 101 remaining in the raw material liquid pipe 101b and the raw material liquid nozzle 3 is extruded by the purge gas 107 and ejected into the vaporizer 2, where it is vaporized. Since the volume of the raw material gas vaporized in the vaporizer 2 is about 100 times that of the supplied raw material liquid, in consideration of this, it is preferable to adjust the flow rate of the purge gas so as not to excessively increase the flow rate of the purge gas with respect to the flow rate of the carrier gas in consideration of this. When the flow rate of the purge gas is $L_P$ [SLM], the raw material liquid remaining in the raw material liquid pipe 101b and the raw material liquid nozzles 3 is extruded by the purge gas at the flow rate $Q_1$ [g/min] according to the equation (2).

$$Q_1 = 0.95 \times 1000 \times L_P \quad (2)$$

When the carrier gas flow rate is $L_C$ [SLM], the saturated vapor pressure of the raw material gas (for example, vaporized OMCTS) at the vaporizer temperature $T_V$ [° C.] is Ps [atm], the total pressure in the vaporizer is P [atm], and the molecular weight of the raw material is M [g/mol], the raw material flow rate $Q_2$ [g/min] is expressed by the following equation (3).

$$Q_2 = \frac{L_c \times M \times P_s}{22.4 \times (P - P_s)} \quad (3)$$

When the volume of the raw material liquid pipe 101b and the raw material liquid nozzle 3 to be purged is $V_1$ [ml], in order to avoid insufficient vaporization of the raw material extruded by the purge gas, at least from the start of flowing the purge gas until the time of $1000V_1/L_P$ elapses, the purge gas flow rate $L_P$ and the carrier gas flow rate $L_C$ may be adjusted so as to satisfy the relationship of $Q_1 < 3 \times Q_2$. The saturated vapor pressure Ps [atm] of the raw material (e.g., OMCTS) at the temperature $T_V$ [° C.] in the vaporizer 2 is obtained from the equation (1). As shown in FIG. 1, the flow rate adjusting means 6 may be provided in the raw material liquid pipe 101b and the purge gas supply pipe 107a for purging the raw material liquid nozzle 3. As the flow rate adjusting means 6, a regulating valve such as a needle valve may be used, or a mass flow controller for gas may be used. A pressure loss portion such as an orifice may be provided to adjust the pressure therebefore and thereafter. When the carrier gas flow rate is $L_C$ and the volume of the raw material liquid pipe 101b and the raw material liquid nozzle 3 to be purged is $V_1$, at least from the start of flowing the purge gas until the time of $V_1/L_P$ elapses, $L_C$ is preferably adjusted to satisfy $L_C/L_P > 10$, and more preferably $L_C/L_P > 20$. In addition, oxygen gas may be further mixed with the mixed gas discharged from the vaporizer 2 toward the burner 4. Then, when the flow rate of the mixed oxygen gases is $L_{O2}$, and the volume of the vaporizer 2 is $V_2$, at least from the start of flowing the purge gas until the time of $V_2/(L_C+L_P)$ elapses, the flow rates are preferably adjusted to satisfy $L_{O2}/L_P > 14$, and more preferably $L_{O2}/L_P > 23$.

As shown in FIG. 1, the raw material liquid pipe 101b and the purge gas supply pipe 107a for purging the raw material liquid nozzle 3 may be provided with an open/close valve 7 upstream of the flow rate adjusting means 6. The open/close valve 7 is closed when the raw material liquid 101 is supplied to the vaporizer 2, and is opened when the supply of the raw material is stopped and the gas purge is performed. By providing the open/close valve 7 upstream of the flow rate adjusting means 6, when the gas purge, immediately after the open/close valve 7 is opened, the pressure of the purge gas from the upstream starts to be applied to the flow rate adjusting means 6, and the flow rate of the purge gas gradually increases. Therefore, it is easy to adjust $L_C/L_P$ and $L_{O2}/L_P$ to the predetermined ranges. Further, it is preferable to provide a check valve 8 downstream of the flow rate adjusting means 6. By providing the check valve 8, it is possible to prevent the raw material liquid 101 from flowing back to the purge gas supply pipe 107a when the raw material is supplied. An open/close valve may be used in place of the check valve 8, in which case it is preferable to open the open/close valve when the raw material supply is stopped, and close the open/close valve when the raw material is supplied.

When the supply of the raw material is stopped, since the open/close valve 5 is in a closed state, it is preferable to provide a raw material liquid branch pipe 101c that branches in the middle of the raw material liquid pipe 101a in order to prevent the raw material liquid 101 that has accumulated in the raw material liquid pipe 101a from the liquid mass flow controller 1 to the open/close valve 5 from causing a pressure fluctuation due to a change in ambient temperature. An open/close valve 9 is provided in the raw material liquid branch pipe 101c, and when the open/close valve 5 is closed and the raw material supply is stopped, the open/close valve 9 is opened. The end of the raw material liquid branch pipe 101c may be connected to the raw material tank 100 as shown in FIG. 1, or may be connected to a recovery tank (not shown). Further, when the pressure in these tanks increases, it may be possible to depressurize using a back-pressure valve or the like. When the open/close valve 5 is opened to supply the raw material, the open/close valve 9 is closed so that the raw material liquid 101 is supplied only to the vaporizer 2 side.

EXAMPLES

Example 1

OMCTS was used as the raw material liquid 101 of the organic siloxane, nitrogen ($N_2$) gas was used as the carrier gas 102, hydrogen ($H_2$) gas was used as the combustible gas 104, and oxygen ($O_2$) gas was used as the combustion supporting gas 105. The combustion supporting gas 105 was supplied as a first combustion supporting gas and a second combustion supporting gas, both of which were $O_2$ gases, the flow rates of which were independently settable. The first combustion supporting gas and second combustion supporting gas were ejected from different ejection ports in the burner. After the external deposition was completed, the flow rate of the raw material was reduced to 0 g/min. On the other hand, the gases other than the raw material continued to flow, and the deposition surface portion of the porous glass base material was baked and tightened by using a plurality of burners.

At this time, the flow rate $L_C$ of the carrier gas 102 was set to 21 SLM, the flow rate $L_{O2}$ of the oxygen gas 106 to be additionally mixed with the mixed gas 103 of the raw material gas and the carrier gas 102 was set to 30 SLM, the flow rate of the combustible gas 104 was set to 250 SLM, the flow rate of the first combustion supporting gas was set to 25 SLM, and the second combustion supporting gas was set to 75 SLM. At the same time when the flow rate of the raw material became 0 g/min, the open/close valve 5 was closed and the open/close valve 9 was opened. Thereafter, by opening the open/close valve 7, the raw material liquid 101 remaining in the raw material liquid pipe 101b and the raw material liquid nozzle 3 was purged by the purge gas from the purge gas supply pipe 107a. Nitrogen ($N_2$) gas was used as the purge gas 107, and the purge gas was supplied at a flow rate $L_P$ of 0.3 SLM. The temperature of the vaporizer 2 was 200° C. When purging was performed under the above conditions, incomplete combustion and liquefaction at the outlet of the burner 4 could be prevented. In addition, it was possible to prevent polymerization products and gel-like substances from being produced at the tip portion of the raw material liquid nozzle 3.

Example 2

Except that the flow rate $L_P$ of the purge gas 107 was 0.9 SLM, the external deposition and the baking and tightening of the deposition surface portion were performed under the same conditions as in Example 1. As a result, incomplete combustion and liquefaction at the outlet of the burner 4 at the time of purging could be prevented. In addition, it was possible to prevent polymerization products and gel-like substances from being produced at the tip portion of the raw material liquid nozzle 3.

Example 3

Except that the flow rate $L_P$ of the purge gas 107 was 1.5 SLM, the external deposition and the baking and tightening of the deposition surface portion were performed under the same conditions as in Example 1. As a result, incomplete combustion occurred at the outlet of the burner 4 during purging. It was possible to prevent polymerization products and gel-like substances from being produced at the tip portion of the raw material liquid nozzle 3.

Example 4

Except that the flow rate $L_P$ of the purge gas 107 was 3.0 SLM, the external deposition and the baking and tightening of the deposition surface portion were performed under the same conditions as in Example 1. As a result, incomplete combustion and liquefaction occurred at the outlet of the burner 4 during purging. It was possible to prevent polymerization products and gel-like substances from being produced at the tip portion of the raw material liquid nozzle 3.

Table 1 shows the flow rate $L_P$ of the purge gas 107, the flow rate $L_{O2}$ of the oxygen gas 106 to be additionally mixed with the mixed gas 103, the flow rate $L_C$ of the carrier gas 102, and occurrence/non-occurrence of incomplete combustion and liquefaction in each example and comparative example.

As described above, in any of the examples, by purging the raw material liquid 101 with the purge gas 107 while stopping the supply of the raw material, it was possible to prevent the polymerization product or the gel-like substance from being produced at the tip portion of the raw material liquid nozzle 3 in the vaporizer 2. From the viewpoint of preventing liquification at the outlet of the burner 4, it has been found that the flow rates of gases are preferably adjusted to satisfy $L_C/L_P>10$, and more preferable to satisfy $L_C/L_P>20$. From the viewpoint of preventing incomplete combustion, it has been found that the flow rates of gases are preferably adjusted to satisfy $L_{O2}/L_P>14$, and more preferable to satisfy $L_{O2}/L_P>23$.

What is claimed is:

1. A manufacturing method of a porous glass base material for optical fiber comprising:
   controlling a flow rate of a raw material liquid of an organic siloxane by a liquid mass flow controller;
   introducing the raw material liquid supplied from the liquid mass flow controller to a raw material liquid nozzle of a vaporizer by a raw material liquid pipe;
   ejecting the raw material liquid from the raw material liquid nozzle into the vaporizer;
   mixing the raw material liquid ejected in the vaporizer and a carrier gas to vaporize the raw material liquid to form a mixed gas in which the raw material gas and the carrier gas are mixed;
   supplying the mixed gas to a burner;
   combusting the mixed gas together with a combustible gas and a combustion supporting gas in the burner to produce $SiO_2$ particles;
   depositing $SiO_2$ particles on a starting core base material to form the porous glass base material for optical fiber;
   closing an open/close valve provided on a flow path of the raw material liquid pipe to stop the supply of the raw material liquid from the liquid mass flow controller, while continuing to supply the carrier gas, combustible gas, and combustion supporting gas; and
   supplying a purge gas from a purge gas supply pipe that joins the raw material liquid pipe between the open/close valve and the raw material liquid nozzle to the raw material liquid pipe after the closing of the open/close valve.

2. The manufacturing method according to claim 1 further comprises additionally mixing oxygen gas into the mixed gas such that the mixed gas includes raw material gas, carrier gas, and oxygen gas, and supplying the mixed gas to the burner.

3. The manufacturing method according to claim 2, wherein when a flow rate of the purge gas supplied from the purge gas supply pipe is $L_P$ and a flow rate of the oxygen gas additionally mixed is $L_{O2}$, in the supplying the purge gas to the raw material liquid pipe, the purge gas and the oxygen gas are respectively supplied so that $L_{O2}/L_P>14$ is satisfied.

4. The manufacturing method according to claim 1, wherein when a flow rate of the purge gas supplied from the purge gas supply pipe is $L_P$ and a flow rate of the carrier gas supplied to the vaporizer is $L_C$, in the supplying the purge gas to the raw material liquid pipe, the purge gas and the

TABLE 1

| | Lp [SLM] | $L_{O2}$ [SLM] | Lc [SLM] | $L_{O2}$/Lp | Lc/Lp | Incomplete Combustion | Liquefaction |
|---|---|---|---|---|---|---|---|
| Example 1 | 0.3 | 21 | 30 | 70 | 100 | no occurrence | no occurrence |
| Example 2 | 0.9 | 21 | 30 | 23 | 33 | no occurrence | no occurrence |
| Example 3 | 1.5 | 21 | 30 | 14 | 20 | occurrence | no occurrence |
| Example 4 | 3.0 | 21 | 30 | 7 | 10 | occurrence | occurrence | carrier gas are respectively supplied so that $L_C/L_P>10$ is satisfied.

5. The manufacturing method according to claim 1, wherein the carrier gas is any of nitrogen, argon, and helium.

6. The manufacturing method according to claim 1, wherein the organic siloxane is octamethylcyclotetrasiloxane (OMCTS).

* * * * *